United States Patent [19]
Utsunomiya et al.

[11] Patent Number: 5,593,789
[45] Date of Patent: Jan. 14, 1997

[54] MAGNETO-OPTICAL RECORDING MEDIUM

[75] Inventors: Hajime Utsunomiya; Kenji Uchiyama; Masanori Kosuda; Hiroyasu Inoue, all of Nagano, Japan

[73] Assignee: TDK Corporation, Tokyo, Japan

[21] Appl. No.: 353,269

[22] Filed: Dec. 5, 1994

[30] Foreign Application Priority Data

Dec. 14, 1993 [JP] Japan .................................. 5-342377

[51] Int. Cl.$^6$ ........................................................ G11B 5/66
[52] U.S. Cl. ........................... 428/694 ML; 428/694 DE; 428/694 RE; 428/694 NF; 428/694 AH; 428/694 XS; 428/336; 204/192.1; 204/192.2; 204/192.32; 204/192.26; 204/192.3
[58] Field of Search ..................... 428/694 ML, 694 DE, 428/694 RE, 694 NF, 694 AH, 694 XS, 900, 336; 204/192.1, 192.2, 192.32, 192.26, 192.3

[56] References Cited

FOREIGN PATENT DOCUMENTS

| | | |
|---|---|---|
| 0502425A2 | 9/1992 | European Pat. Off. . |
| 0502425 | 9/1992 | European Pat. Off. . |
| 4-19618 | 1/1986 | Japan . |
| 63-32750 | 2/1988 | Japan . |
| 4-313835 | 11/1992 | Japan . |

OTHER PUBLICATIONS

Recording Field Sensitivity of Magento-Optical Disks Using Very Thin Exchange-Coupled Films; Ichitani et al. Proceedings of Magneto-Optical Recording International Symposium '92; pp. 196-200.

*Primary Examiner*—Leszek Kiliman
*Attorney, Agent, or Firm*—Watson Cole Stevens Davis, PLLC

[57] ABSTRACT

This invention has for its object to provide a magneto-optical recording medium at low costs, which is high in magnetic field sensitivity and reliability, and enables high C/N to be obtained even at high linear velocity.

The magneto-optical recording medium of this invention includes on a substrate a first dielectric film, a recording film of a rare earth element-transition element alloy (including Fe), a second dielectric film containing a metal element M and nitrogen N and a reflective film. In this medium, the recording film is up to 65 nm in thickness, and the respective diffusion indices of oxygen, nitrogen and metal element M in the vicinity of the boundary between the second dielectric and recording films are within the predetermined ranges, when the element distribution is measured by Auger electron spectroscopy under the predetermined conditions. The maximum value of the oxygen content in the vicinity of said boundary is 5 to 25 at %.

13 Claims, 6 Drawing Sheets

MAGNETO-OPTICAL RECORDING MEDIUM

BACKGROUND OF THE INVENTION

1. Field of the Invention

This invention relates to a magneto-optical recording medium.

2. Prior Art

Optical discs are of great interest as high capacity information carrying media. Among the optical discs, magneto-optical discs of the magnetic field modulation system are expected to find use in data files or the like. A magneto-optical disc is recorded in a magnetic field modulation mode by directing a laser beam from an optical head to the recording layer of the disc in a DC manner for raising the temperature thereof and simultaneously applying a modulated magnetic field across the recording layer from a magnetic head opposed to the optical head. Therefore, the magnetic field modulation mode allows for overwrite recording.

Recently, a magneto-optical disc of the magnetic field modulation mode (known as a mini-disc) which can record and reproduce signals at low linear velocity equivalent to the linear velocity (1.2 m/s to 1.4 m/s) of compact discs (CDs) has been put into commercial practice. This magneto-optical disc can share a drive unit with read-only optical discs of the specification complying with the CD. The potential applications of the drive unit for this magneto-optical disc include a portable type where it is required to reduce power consumption. However, the magneto-optical disc of the magnetic field modulation mode needs a recording magnetic head as well as an optical head, often leading to an increased power consumption. Therefore, there is a desire for a disc which is so sensitive to a magnetic field as to enable recording in a low magnetic field. The low magnetic field recording enables power consumption and hence battery size to be reduced. There is also obtained an advantage in designing of the magnetic head in that the number of coil windings in the magnetic head can be reduced.

However, conventional magneto-optical discs, for example, 3.5-inch magneto-optical discs complying with the ISO standard generally require a recording magnetic field of 200 Oe or higher in order to obtain sufficient C/N. For the above-mentioned mini-discs, on the other hand, it is desired to reduce the recording magnetic field strength to below 100 Oe, preferably below 80 Oe in order to minimize power consumption. It is also desired that at least 46 dB C/N be achieved at such a low magnetic field strength.

In order to use them for data discs for computer purposes, it is required to increase the recording linear velocity for achieving an increased data transfer speed. CD-ROMs have now been used at double, treble and quadruple the linear velocity. In the mini-discs, too, it is required to use a linear velocity at least twice as high. High linear velocity results in a C/N drop even at the same recording magnetic field strength; that is, for recording at high linear velocity it is required to prevent the C/N drop by increasing the magnetic field strength. With conventional magneto-optical discs highly sensitive to magnetic fields, however, it is impossible to obtain sufficient C/N even when the magnetic field is increased corresponding to the high linear velocity. In other words, when the magnetic field sensitivity is increased, there is some considerable decrease in the peak C/N value. Never until now is any magneto-optical disc enabling high C/N to be achieved in both low and high magnetic fields achieved.

Japanese Patent Application Kokai (JP-A) No. 313835/1992 proposes "a method for preparing a magneto-optical recording medium by successively forming at least a rare earth element-transition metal alloy thin film and a dielectric film on a substrate wherein after the rare earth element-transition metal alloy thin film is formed, the substrate is maintained in an as-discharged atmosphere, the atmosphere containing at least oxygen gas or a gas of a compound containing oxygen as one constituent element", and alleges that high C/N is accomplished in a low recording magnetic field. However, rare earth elements are readily oxidizable materials as is well known in the art. Indeed, experimentation made by the inventors has revealed that it is very difficult to place the amount of the gas of a compound containing oxygen as one constituent element ($CO_2$, etc.) under optimum control and it is difficult to achieve the desired properties in a consistent manner. The incorporation of oxygen in the magnetic layer formed of such a rare earth element-transition metal alloy is found to offer another problem in that the magnetic field sensitivity drops gradually upon accelerated testing at high-temperature and high humidity.

Besides, Ichitani et al., "Recording field sensitivity of magneto-optical disks using very thin exchange-coupled film", J. Magn. Soc. Jpn., Vol. 17, Supplement No. S1 (1993), pp. 196–200 describe that a high magnetic field sensitivity suitable for the magnetic field modulation mode is achievable by using a laminate film of GdFeCo and TbFeCo as the recording film. With this method, however, difficulty is involved in cost reductions due to an increase in the number of steps.

SUMMARY OF THE INVENTION

An object of this invention is to provide a magneto-optical recording medium at low costs, which is high in terms of magnetic field sensitivity and reliability and enables high C/N to be obtained even at high linear velocity.

According to this invention, such an object is achieved by the following embodiments 1 to 13 of the invention mentioned just below.

(1) A magneto-optical recording medium comprising a first dielectric film, a recording film of a rare earth element-transition metal alloy, a second dielectric film, and a reflective film on a transparent substrate in the described order, characterized in that:

a metal element M and nitrogen N are contained in the second dielectric film, Fe is contained in the recording film, and oxygen O is contained in the vicinity of the boundary between the second dielectric and recording films, and an element distribution from the second dielectric film to the recording film is measured by Auger electron spectroscopy at an electron gun accelerating voltage of 5 kV, an electron gun irradiating current of 500 nA and an ion gun accelerating voltage of 2 kV, and the measurements are plotted on a chart with etching time on analysis as abscissa and atomic percentage as ordinate, said magneto-optical recording medium conforming to the following condition:

$$0.10 \leq (O_E - Fe_S)/(Fe_E - Fe_S) \leq 0.40$$

where $O_E$ is the etching time at which the O content in the vicinity of the boundary between the second dielectric and recording films becomes $\{(O_{M2}-O_B)/5\}+O_B$ where $O_{M2}$ is the maximum value of the O content in the vicinity of the boundary between the second dielectric and recording films, and $O_B$ is the minimum value of the O content of the recording film, with the proviso that $O_E>O_P$ where $O_P$ is the etching time at which the O content becomes $O_{M2}$, $Fe_S$ is the etching time at which the Fe content in the vicinity of the boundary between the second dielectric and recording films decreases to ⅕ of $Fe_M$ where $Fe_M$ is the maximum value of the Fe content in the recording film, and $Fe_E$ is the etching time at which the Fe content in the vicinity of the boundary between the first dielectric and recording films decreases to ⅕ of $Fe_M$, said magneto-optical recording medium conforming to the following condition on said chart:

$$0.10 \leq (N_E-Fe_S)/(Fe_E-Fe_S) \leq 0.35$$

where $N_E$ is the etching time at which the N content in the vicinity of the boundary between the second dielectric and recording films decreases to ⅕ of $N_M$ where $N_M$ is the maximum value of the N content in the second dielectric film, said magneto-optical recording medium conforming to the following condition on said chart:

$$0 \leq (M_E-Fe_S)/(Fe_E-Fe_S) \leq 0.20$$

where $M_E$ is the etching time at which the content of the metal element M in the vicinity of the boundary between the second dielectric and recording films decreases to ⅕ of $M_M$ where $M_M$ is the maximum value of the content of the metal element M in the second dielectric film, said $O_{M2}$ being 5 to 25 at %, and the thickness of the recording film being up to 65 nm.

(2) The magneto-optical recording medium of (1) which further conforms to $$0.10 \leq (O_E-Fe_S)/(Fe_E-Fe_S) \leq 0.35$$

(3) The magneto-optical recording medium of (1) which further conforms to $$0.10 \leq (N_E-Fe_S)/(Fe_E-Fe_S) \leq 0.25$$

(4) The magneto-optical recording medium of (1) which further conforms to $$0 \leq (M_E-Fe_S)/(Fe_E-Fe_S) \leq 0.15$$

(5) The magneto-optical recording medium of (1) wherein $O_{M2}$ is 5 to 20 at %.

(6) The magneto-optical recording medium of (1) wherein the thickness of the recording film is 10 to 45 nm.

(7) The magneto-optical recording medium of (1) which further includes an intermediate film between the recording and second dielectric films, said intermediate film being formed of a metal containing at least one metal element, the metal element contained in the intermediate film being different from the metal element contained in the second dielectric film, and the thickness of the intermediate film being 1 to 28Å.

(8) The magneto-optical recording medium of (1) which further conforms to the following condition on said chart:

$$O_{M1} < O_{M2}$$

where $O_{M1}$ is the maximum value of the oxygen content in the vicinity of the boundary between the first dielectric and recording films.

(9) The magneto-optical recording medium of (8) which further conforms to $$0 \leq (O_{M1}-O_B) \leq 10 \text{ at \%}$$

(10) The magneto-optical recording medium of (1) wherein the minimum value $O_B$ of the oxygen content in the recording film is up to 7 at %.

(11) The magneto-optical recording medium of (1) wherein the metal element M contained in the second dielectric film is Si and/or Al.

(12) The magneto-optical recording medium of (1) wherein the maximum value $N_M$ of the N content in the second dielectric film is at least 30 at %.

(13) The magneto-optical recording medium of (1) which is used at a linear velocity of 2.4 to 5.6 m/s relative to a recording head.

FUNCTION AND ADVANTAGE

In this invention, the peak of the oxygen content is found in the vicinity of the boundary between the second dielectric and recording films, $(O_E-Fe_S)/(Fe_E-Fe_S)$, $(N_E-Fe_S)/(Fe_E-Fe_S)$, $(M_E-Fe_S)/(Fe_E-Fe_S)$ and $O_{M2}$ are controlled such that they come within the above-defined ranges on the element distribution chart, and the thickness of the recording film is limited to the above-defined range, so that a magneto-optical recording medium can be achieved, which enables high C/N to be obtained even upon in a low magnetic field, is high in stability, and makes it possible to obtain high C/N even at high linear velocity. $(O_E-Fe_S)/(Fe_E-Fe_S)$, $(N_E-Fe_S)/(Fe_E-Fe_S)$ and $(M_E-Fe_S)/(Fe_E-Fe_S)$ are indices of diffusion of oxygen, nitrogen and metal element, respectively, in the vicinity of the boundary between the second dielectric and recording films. Hereinafter, these terms will be called the oxygen, nitrogen and metal element diffusion indices, respectively.

The reason the peak of the oxygen content is located in the vicinity of the second dielectric and recording films is that the diffusion of nitrogen atoms into the recording film is inhibited during the formation of the second dielectric film to avoid any possible damage to the recording film, so that high C/N can be obtained upon recording in a low magnetic field. The reason the oxygen diffusion index is limited to the above-defined range is that not only is the diffusion of nitrogen inhibited to achieve some considerable C/N improvement in a low magnetic field but any excessive oxidation of the recording film is also prevented to impart sufficient magnetic properties thereto. Even when the oxygen diffusion index is within the optimum range, however, corrosion may proceed slowly from the vicinity of the peak of the oxygen content to the recording film due to anode-cathode reactions, resulting in a gradual drop of the magnetic field sensitivity; in other words, long-term reliability or reliability under severe conditions becomes insufficient. If the nitrogen diffusion index is within the above-defined range, however, it is then possible to inhibit the oxidation reaction of the recording film and so have a stable effect on improving magnetic field sensitivity over an extended period of time. Moreover, if the nitrogen diffusion index is within the above-defined range, then damage nitrogen may do to the recording film is little, if any, so that high magnetic field sensitivity can be obtained.

As mentioned above, some remarkable improvement in magnetic field sensitivity is achievable by controlling the oxygen and nitrogen diffusion indices such that they come within the above-defined ranges. As the diffusion of the metal element from the second dielectric film increases, however, the saturation magnetization of the recording film decreases. Consequently, no sufficient C/N improvement is achieved even at a high recording magnetic strength. For this reason, no sufficient C/N is obtained even when the recording magnetic field strength is increased corresponding to higher linear velocity. This in turn gives rise to an increased error when MDs are applied as data discs at high transfer speed. Similar problems arise even when data are copied at high speed. According to this invention, in contrast, it is possible to obtain high-enough C/N even at high linear velocity, because the metal element diffusion index of the second dielectric film is controlled such that it comes within the above-defined range.

JP-A 6582/1993, the object of which is to provide a magneto-optical recording medium which can be recorded in a low magnetic field, proposes "a magneto-optical recording medium in which a recording layer including at least a rare earth element-transition metal alloy film and a dielectric layer are laminated on a substrate in the described order, characterized in that an area of the said recording layer that contains the element derived from the said dielectric layer is up to 70Å as measured from the interface of the recording and dielectric layers, when the film structure is analyzed by Auger electron spectroscopy in the depthwise direction". Auger profiles prepared in the example and comparative examples are described on the publication. From these Auger profiles, the oxygen, nitrogen and metal element diffusion indices defined herein were calculated. Then the oxygen and nitrogen diffusion indices in one example (of FIG. 1) are found to be within the ranges defined herein, but the metal element diffusion index of the dielectric layer is 0.207, a figure exceeding the upper limit of the range defined herein. For this reason, no high C/N can be obtained upon recording at a high magnetic field strength. In this example, 48.6 dB is reported for C/N in an external recording magnetic field of ±70 Oe. In Comparative Examples 1 (FIG. 2) and 2 (FIG. 3) of the publication, the oxygen diffusion index values are 0.059 and 0.052, while the values corresponding to $O_{M2}$ defined herein are 4.1 at % and 3.9 at %, all not reaching the lower limits of the ranges defined herein. In these comparative examples, the C/N value is lower than 42.8 dB at an external recording magnetic field of ±70 Oe.

The invention disclosed in JP-A 124491/1994 laid open after the filing of the basic application of this application is identical in object with the invention set forth in JP-A 6582/1993 mentioned above. In JP-A 124491/1994, too, Auger profiles are described. As disclosed in the example (FIG. 1) described in the publication of this application, however, the value corresponding to $O_{M2}$ defined herein is 3.1 at % that is less than the lower limit of the range defined herein, although the metal element diffusion index is 0.19. In Comparative Example 1 (FIG. 2) of the publication, the value corresponding to $O_{M2}$ is 1.7 at % and the metal element diffusion index is 0.214, both departing from the ranges defined herein. In Comparative Example 2 (FIG. 3) of the publication, the oxygen diffusion index is 0.452 that again departs from the range defined herein, although the metal element diffusion index is 0.196. In the example of the publication, about 48 dB is exemplified for C/N at a magnetic field strength as low as about 80 Oe, while about 50 dB (FIG. 4) is exemplified at a relatively high magnetic field strength of about 200 to 300 Oe, both the figures being tantamount to those reported for C/N in Table 2 to be given later. When the medium according to the embodiment of this invention is measured for C/N under the same conditions as in the example of the publication, however, the obtained peak value is about 51 dB that is higher than that of the publication by about 1 dB. When the medium of the publication is measured for C/N under the same conditions as in the embodiment of this invention,-to the contrary, the obtained peak value is barely about 49 dB that is lower than that of this invention about 1 dB. The conditions for C/N measurement set forth in the publication are 1.4 m/s for the medium linear velocity and 720 kHz for the recording frequency, with a recording mark length of 0.97 μm. In the embodiment of this invention, on the other hand, since the linear velocity is 1.28 m/s and the recording frequency is 720 kHz (3T signals of EFM), the recording mark length is 0.89 μm. Due to such a recording mark length difference, the C/N value obtained in the example of the referred-to publication is always about 1 dB higher than that obtained in the embodiment of this invention. Insofar as the example of the publication is concerned, it is believed that no high C/N can be obtained in both low and high magnetic fields.

JP-A32750/1988 discloses "an information recording medium wherein an information recording layer composed predominantly of a rare earth element-transition metal type of amorphous alloy contains up to 10 at % of oxygen in a boundary portion adjacent thereto." The results of the composition distribution of samples measured by Auger spectroscopy in the film thickness direction are shown in FIG. 4(A) to (D) of the publication. These samples are each obtained by the successive lamination of silicon nitride, TbFeCo and silicon nitride on a polycarbonate substrate by sputtering. From the respective peak strength curves for O, N and Fe atoms shown in the figure referred to above, the ratios $(O_E-Fe_S)/(Fe_E-Fe_S)$ and $(N_E-Fe_S)/(Fe_E-Fe_S)$ were calculated as in this invention. It has thus been found that some samples have the ratios coming within the ranges defined herein.

However, the object of the invention set forth in the publication described above is to "provide an information recording medium that is excellent in resistance to oxidation and corrosion and shows good-enough recording properties with a limited or reduced bit error rate." Nowhere in the publication is any improvement in magnetic field sensitivity referred to at all. With the information recording medium described in the publication, indeed, it is impossible to achieve any effect on improving magnetic field sensitivity for the reason mentioned just below. The thickness of the TbFeCo layer used as the specimen for preparing FIG. 4 is 800Å that is larger than the upper limit of the range defined herein (up to 650Å). At a thickness exceeding 650Å, the absorbance of the recording film increases so critically that the quantity of the light reaching the reflective film is decreased. Consequently, the Faraday effect becomes slender, resulting in a large C/N drop and so a remarkable decrease in magnetic field sensitivity. It is here noted that the publication mentioned above is silent about the linear velocity of the medium.

Moreover, the publication mentioned above discloses nothing about the conditions for Auger spectroscopy such as those defined herein. For instance, since oxygen is released from the substrate of the medium, the oxygen content varies depending on the degree of vacuum at the time of the initiation of measurement. With an ion gun used at an increased accelerating voltage, the implantation of the element to be measured becomes so intensified by knocked-on atoms that the apparent diffusion of the element to be measured becomes extensive. Thus, it is believed that the Auger spectroscopy graphs shown in the publication mentioned above are in no sense suggestive of this invention.

Throughout FIGS. 4(A) to (D) of the publication, there is an oxygen concentration peak of almost equivalent strength between the TbFeCo layer and each of the silicone nitride layers formed on both its sides. In the magneto-optical recording medium of this invention, however, any oxygen concentration peak is not substantially found between the first dielectric and recording films. If a certain oxygen concentration peak should be found between them, it is to be much lower than the oxygen concentration peak between the second dielectric and recording films. In this regard, too, this invention distinguishes over that disclosed in the publication. If the recording film is as thin as 65 nm or less as in this invention and an oxygen concentration peak that is almost equivalent in strength to that between the second dielectric and recording films is found between the substrate-side first dielectric film and the recording film, then the oxygen content of the recording film becomes so high that the magnetic properties degrade significantly. To the contrary, if the peak values on both sides are decreased such that the magnetic properties are not significantly affected, then the oxygen concentration peak located on the second dielectric film side becomes less effective. In FIGS. 4(B), (C) and (D) with the nitrogen diffusion index lying within the inventive range, the oxygen content peaks are shown to lie at up to 10 at %, but are slightly lower than those obtained in preferable embodiments of this invention.

In JP-A 313835/1992 mentioned above, there is a description to the effect that it is presumed that a layer having an oxygen-containing composition, which is formed on the magnetic layer by holding the substrate with the magnetic layer formed thereon in an as-discharged atmosphere containing oxygen and other gases, would take part in preventing any possible penetration of elements (e.g., N and $N^+$) derived from the dielectric film into the magnetic layer. While the invention set forth in the publication is analogous to this invention in terms of nitrogen diffusion control, it is to be understood that difficulty is involved in obtaining the desired properties in a stable manner by holding the magnetic film in an as-discharged atmosphere containing oxygen and other gases, as previously mentioned. The publication discloses in the example that the magnetic film has a thickness of 200 to 300Å. When such a thin magnetic film is partially oxidized by the method set forth in the publication, however, it is very difficult to obtain stable properties under various accelerated reliability tests. In addition, the publication states nothing about illustrative or specific values for the diffusion of nitrogen atoms. Nor is the oxygen content distribution in the magnetic film disclosed.

ILLUSTRATIVE CONSTRUCTION

Some illustrative constructions of this invention will now be explained at great length.

Figure 1:
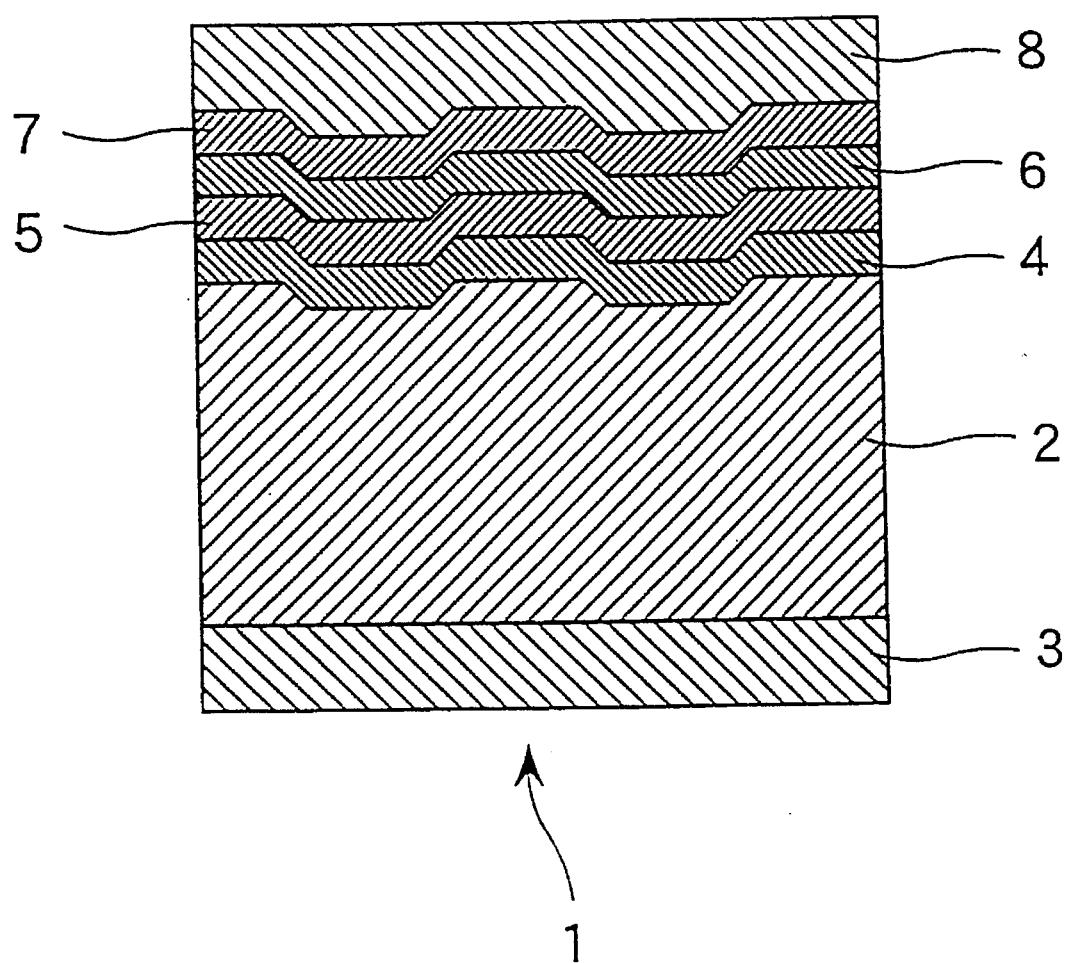
FIG. 1 is a partial sectional view of one exemplary arrangement of the magneto-optical disc according to this invention.

FIG. 1 illustrates one exemplary arrangement of a magneto-optical disc that is one embodiment of the magneto-optical recording medium according to this invention. As illustrated, a magneto-optical disc generally shown at 1 includes on the surface of a transparent substrate 2 a first dielectric film 4, a recording film 5, a second dielectric film 6, a reflective film 7 and a protective coat 8.

For recording and reproduction with the magneto-optical disc according to this invention, an optical head is located on the rear surface side (the lower side in the figure) of the transparent substrate 2, so that the recording film can be irradiated with laser light through the transparent substrate. For the transparent substrate, glass and transparent resins such as polycarbonate, acrylic resin, amorphous polyolefin, and styrene resin are used.

The first dielectric film 4 and second dielectric film 6 have functions of improving C/N and preventing corrosion of the recording film. The first dielectric film has a thickness of about 40 to about 200 nm, and the second dielectric film has a thickness of about 10 to about 100 nm. The first dielectric film is made up of dielectric materials such as oxides, carbides, nitrides and sulfides which may be used alone or in mixtures of two or more (e.g., LaSiON). The second dielectric film contains the metal element M and nitrogen N. For the metal element M it is preferable to use Si and/or Al. In other words, the second dielectric film has preferably a composition of Si—N, Al—N, or Si—Al—N.

Information is magnetically recorded on the recording film 5 by use of either a modulated heat beam or a modulated magnetic field, and the recorded information is reproduced through magneto-optical conversion. The magneto-optical disc of this invention is generally used in the magnetic field modulation mode. The recording film 5 is made up of an alloy containing rare earth and transition elements. Preferably, the rare earth element is at least one element selected from Tb, Dy, Nd, Sm, Pr and Ce, while the transition element is essentially Fe and optionally contains Co. The specific contents of the respective elements may suitably be determined depending on the required Curie temperature, coercivity, reproducing properties, etc. Here let R denote the rare earth element and $R_A Fe_B Co_C$ stand for the atomic composition. It is then preferable that:

$10 \leq A \leq 35$ $55 \leq B \leq 75$ $3 \leq C \leq 15$ $A+B+C=100$

Besides, the recording film may contain various elements such as Cr and Ti on demand. However, it is preferable that the contents of these additive elements in the recording film is up to 12 at %. Cr and/Ti are particularly preferable as the additive elements, and the recording film preferably contains them in a total amount of 1 to 10 at %. For illustrative compositions, mention is made of Tb—Fe—Co, Tb—Fe—Co—Cr, Tb—Fe—Co—Ti, Tb—Fe—Co—Cr—Ti, Dy—Tb—Fe—Co, and Nd—Dy—Fe—Co. The recording film 5 has a thickness of up to 65 nm, preferably 10 to 45 nm. With a recording film of higher than 65 nm in thickness, the benefits of this invention are not achieved due to a decrease in magnetic field sensitivity for the reason already mentioned. At up to 45 nm the recording film is very effective for improving magnetic field sensitivity. In this regard, it is noted that when the thickness of the recording film is below 10 nm, the magnetic properties are greatly affected by the diffusion of oxygen or nitrogen, resulting not only in a C/N decrease but also in a drastic reflectivity increase which otherwise gives rise to a recording sensitivity decrease.

The magneto-optical disc of this invention is characterized by an element distribution from the second dielectric film to the recording film. The element distribution is measured by use of Auger electron spectroscopy (AES), while the second dielectric and recording films are successively etched. Referring here to the measuring conditions, an electron gun is maintained at an accelerating voltage of 5 kV and an irradiating current of 500 nA, and an ion gun at an accelerating voltage of 2 kV. It is preferable that the angle of incidence of argon ions used for sputtering is at least 50 degrees. This angle of incidence is defined as the angle that the direction of incidence of argon ions make with the normal line of the film surface. The larger the angle of incidence, the higher the resolving power of the film in the thickness direction. It is understood that the angle of incidence is usually at 70 degrees or less.

The measurement of the element distribution in the film thickness direction is carried out in an intermittent etching manner in which ion etching and the quantitative measurement of each element are alternately repeated. The span of time for one etching cycle may be about 30 to about 45 seconds. The etching rate varies with the ion gun accelerating voltage, and film composition. For instance, when etching occurs under the conditions mentioned above, the etching rate is about 24 Å/min for $SiO_2$ film (of 337 Å in thickness) for measuring film thickness, about 13 Å/min for Si—N film, and about 12 Å/min for Tb—Fe—Co film. In any case, the etching rate is within the range of these values ±about 5Å/min, usually ±2 Å/min.

To preclude any adverse influence of gases leaving the substrate, etc., a magneto-optical disc is placed in a measuring vessel, which is then evacuated to a degree of vacuum of up to $1.0 \times 10^{-9}$ Torr. During the measurement, the degree of vacuum drops to about $1 \times 10^{-8}$ to about $1 \times 10^{-7}$ Torr due to the injection of argon ions into the measuring vessel.

Figure 2:
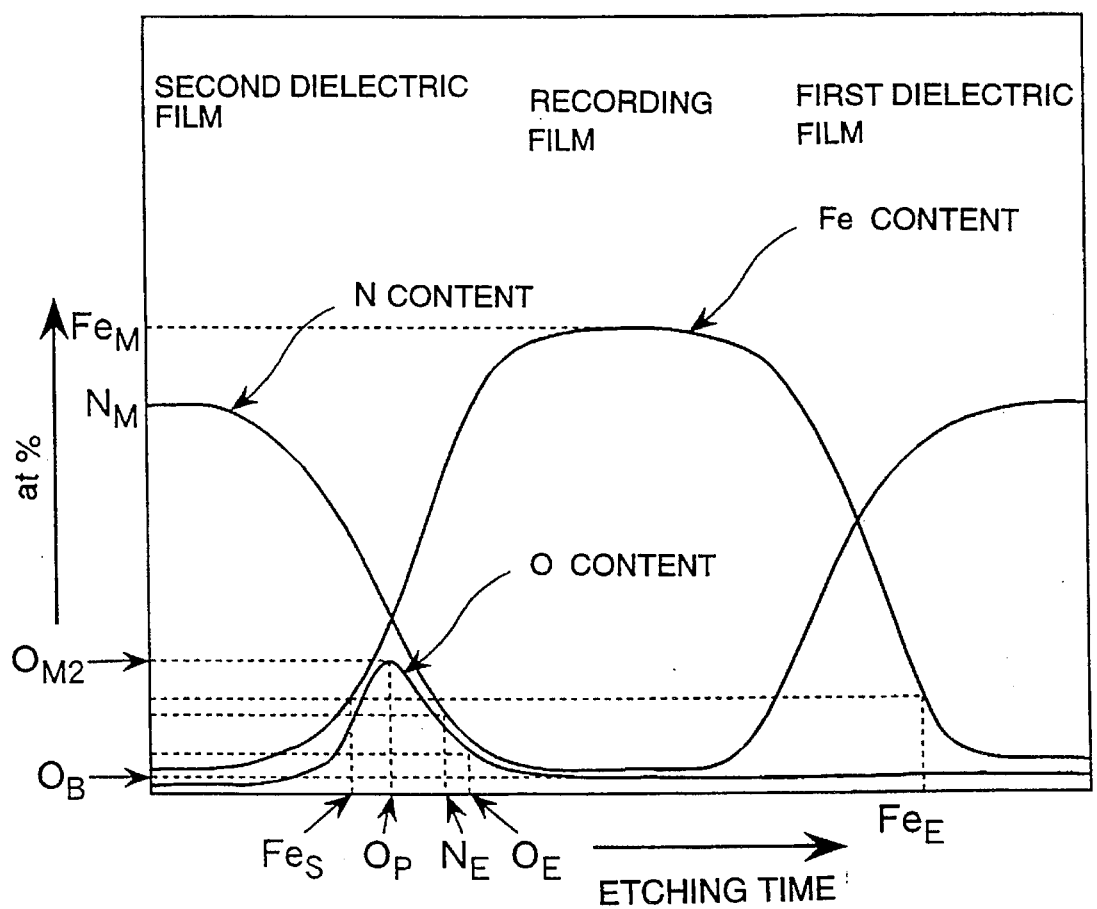
FIG. 2 is a schematic chart for illustrating the results obtained by measuring the distribution of elements (Fe, O and N) from the second dielectric film to the recording film by Auger electron spectroscopy.

The number of counts for each element measured by Auger electron spectroscopy under such conditions is calculated in atomic percentage, and the found values are plotted on a chart with etching time on analysis as abscissa and atomic percentage as ordinate. Schematic representations of this chart are given in FIGS. 2 and 3. In the magneto-optical recording medium of this invention, as shown, the second dielectric film contains the metal element M and nitrogen N, the recording film contains Fe, and O is present in the vicinity of the boundary between the second dielectric and recording films, at which the peak content of O is found. Here let $O_{M2}$ denote this peak value, i.e., the maximum value of the O content; $O_B$ denote the minimum value of the O content in the recording film; Op denote the etching time at which the O content becomes $O_{M2}$; $O_E$ denote the etching time at which the O content in the vicinity of the boundary between the second dielectric and recording films becomes $\{(O_{M2}-O_B)/5\}+O_B$ with the proviso that $O_E > O_P$; $Fe_S$ denote the etching time at which the Fe content in the vicinity of the boundary between the second dielectric and recording films decreases to 1/5 of $Fe_M$ where $Fe_M$ is the maximum value of the Fe content in the recording film, and $Fe_E$ denote the etching time at which the Fe content in the vicinity of the boundary between the first dielectric and recording films decreases to 1/5 of $Fe_M$. It is then desired that the magneto-optical recording medium conform to $$0.10 \leq (O_E - Fe_S)/(Fe_E - Fe_S) \leq 0.40$$

preferably $$0.10 \leq (O_E - Fe_S)/(Fe_E - Fe_S) \leq 0.35$$

In the charts mentioned above, $N_E$ is the etching time at which the N content in the vicinity of the boundary between the second dielectric and recording films decreases to 1/5 of $N_M$ where $N_M$ is the maximum value of the N content in the second dielectric film. It is then desired that the magneto-optical recording medium conform to $$0.10 \leq (N_E - Fe_S)/(Fe_E - Fe_S) \leq 0.35$$

preferably $$0.10 \leq (N_E - Fe_S)/(Fe_E - Fe_S) \leq 0.25$$

Figure 3:
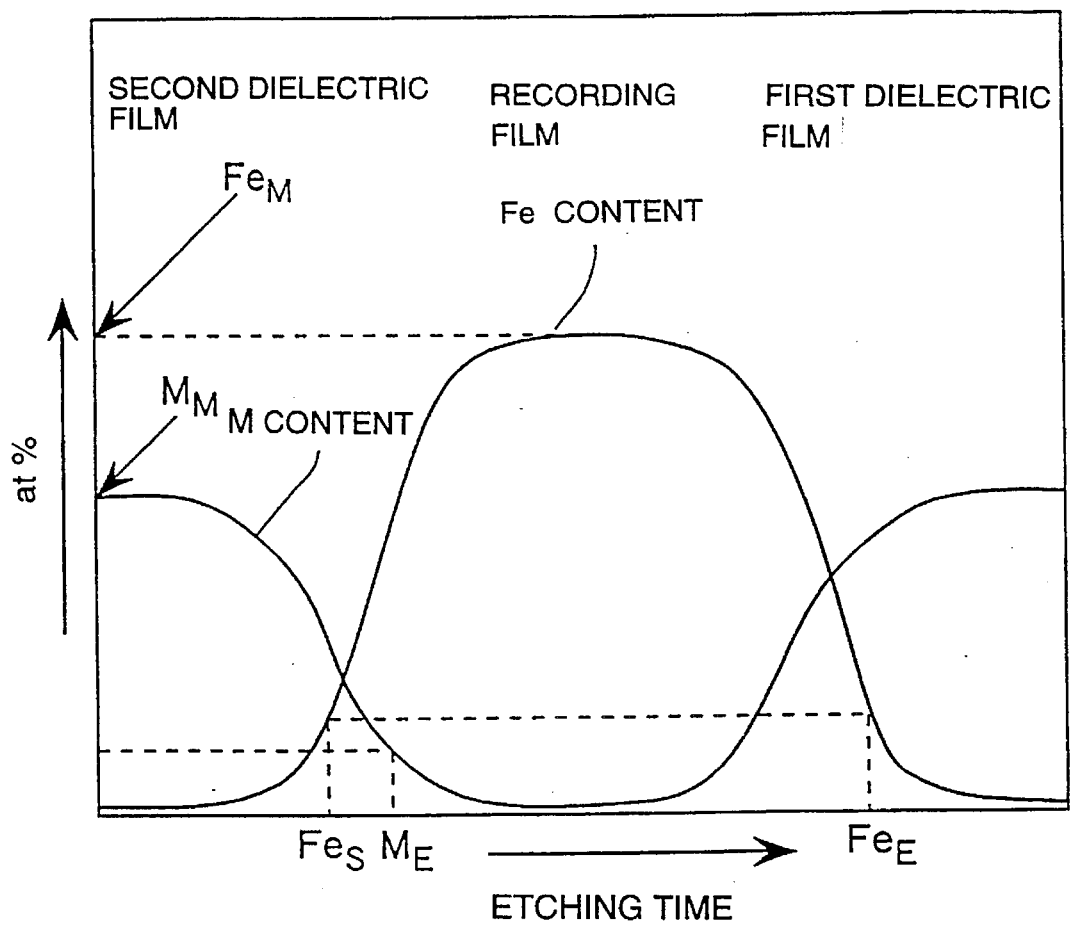
FIG. 3 is a schematic chart for illustrating the results obtained by measuring the distribution of elements (Fe and N) from the second dielectric film to the recording film by Auger electron spectroscopy.

In the present invention, the metal element M contained in the second dielectric film is also controlled in terms of the degree of diffusion as in the case of N. In the charts prepared on the basis of measurements obtained by use of Auger electron spectroscopy under the conditions mentioned above, $M_M$ is the maximum value of the content of the metal element M in the second dielectric film, and $M_E$ is the etching time at which the content of the metal element M in the vicinity of the boundary between the second dielectric and recording films decreases to 1/5 of $M_M$, as shown in FIG. 3. It is then desired that $$0 \leq (M_E - Fe_S)/(Fe_E - Fe_S) \leq 0.20$$

preferably $$0 \leq (M_E - Fe_S)/(Fe_E - Fe_S) \leq 0.15$$

be satisfied. When the second dielectric film contains two or more metals like Si—Al—N, it is preferable that, for each metal, $(M_E - Fe_S)/(Fe_E - Fe_S)$ comes within the range mentioned above.

$(O_E - Fe_S)/(Fe_E Fe_S)$ is the oxygen diffusion index in the vicinity of the boundary between the second dielectric and recording films, $(N_E - Fe_S))/(Fe_E - Fe_S)$ is the nitrogen diffusion index in the vicinity of the boundary between the second dielectric and recording films, and $(M_E - Fe_S)/(Fe_E - Fe_S)$ is the metal element diffusion index in the vicinity of the boundary between the second dielectric and recording films. In this invention, if the oxygen and nitrogen diffusion indices are within the ranges mentioned above, it is then possible to obtain sufficient C/N of at least 46 dB at a low magnetic field strength of up to 80 Oe and keep high C/N over an extended period of time in a stable manner. Moreover, if the metal element diffusion index is within the range mentioned above, it is then possible to obtain high C/N even at a high recording magnetic field strength while the high C/N obtained at a low recording magnetic field strength is kept intact; that is, it is possible to obtain high C/N even at high linear velocity. Too small an oxygen diffusion index entails an increase in the nitrogen diffusion index, resulting in a magnetic field sensitivity decrease. Too large an oxygen diffusion index incurs a magnetic field sensitivity decrease due to the oxidation of the recording film, and gives rise to a drop of reliability as well. At too small a nitrogen diffusion index, corrosion proceeds gradually from the vicinity of the peak of the oxygen content curve to the recording film due to anode-cathode reactions, resulting in a gradual decrease in magnetic field sensitivity. Too large a nitrogen diffusion index, on the other hand, entails a large C/N decrease, so that the magnetic head is heavily loaded, resulting in an increased power consumption. The reason would be that N diffused into the recording film is bonded to Fe in the recording film to vary the magnetic properties of the recording film. When the metal element diffusion index is too large, there is a C/N decrease at a high recording magnetic field strength; that is, any high C/N cannot be obtained, for instance, when the linear velocity is increased to 2.4 m/s or higher. It is here noted that the upper limit of the linear velocity, although varying depending on the properties of the recording magnetic head used, etc., is usually placed on about 5.6 m/s when a general magneto-optical recording device is used.

In this invention, it is preferable that (oxygen diffusion index)/(nitrogen diffusion index), i.e., $(O_E-Fe_S)/(N_E-Fe_S)$ is from 0.5 to 2.0, and (metal element diffusion index)/(nitrogen diffusion index), i.e., $(M_E-Fe_S)/(N_E-Fe_S)$ is from 0 to 1.0. Much better properties are obtainable if the diffusion index ratios are within such ranges.

$O_{M2}$ is from 5 to 25 at %, preferably from 5 to 20 at %, more preferably from 10 to 20 at %, and most preferably from 11 to 20 at %. When $O_{M2}$ is too large, the coercivity of the recording film decreases due to the selective oxidization of the rare earth element in the recording film. Consequently, the adjacent tracks are adversely affected when recording occurs in a high magnetic field or at high temperature. The object of this invention is to obtain high C/N upon recording in a low magnetic field. In the recording medium of this invention, too, it is required that high properties be assured in a high recording magnetic field, and this is particularly important when the recording linear velocity is increased. When $O_{M2}$ is too small, on the other hand, the nitrogen diffusion index is likely to increase, resulting in a drop of magnetic field sensitivity.

It is here noted that $O_B$ or the minimum value of the O content in the recording film is preferably up to 7 at %, more preferably 5 at %, but usually at least 2 at %.

In this invention, it is preferable that the oxygen content curve has no substantial peak in the vicinity of the boundary between the first dielectric and recording films on the chart mentioned above. In this invention for which the recording film must be thin, the fact that the oxygen content curve has a peak at this area means that the magnetic properties of the recording film drops significantly due to too large a content of oxygen in the recording film. Specifically, it is desired that preferably $0 \leq (O_{M1-OB}) \leq 10$ at %, more preferably $0 \leq (O_{M1}-O_B) \leq 5$ at % be satisfied, where $O_{M1}$ is the maximum value of the oxygen content in the vicinity of the boundary between the first dielectric and recording films. It is also desired that preferably $O_{M1} < O_{M2}$, more preferably $0 \leq (O_{M1-OB})/(O_{M2}-O_B) \leq 0.5$ be satisfied.

To prevent any possible incorporation of oxygen from the recording film to the first dielectric film, it is preferable reduce as much as possible the pressure that a vacuum chamber is to reach. However, satisfactory results are obtainable if the pressure that the vacuum chamber reaches is placed on $1 \times 10^{-4}$ Pa or less.

The maximum value $N_M$ of the N content of the second dielectric film is preferably at least 30 at %, more preferably at least 35 at %. When $N_M$ is too small, not only does the quantity of light absorbed by the second dielectric film increase, but the effect on improving C/N becomes insufficient as well. Although varying depending on composition, $N_M$ ranges usually from about 40 to about 60 at %.

No particular limitation is imposed on how to control $(O_E-Fe_S)/(Fe_E-Fe_S)$, but the following method is preferred as an example. That is, oxygen is adsorbed or diffused in the vicinity of the surface of the recording film after the recording film has been formed and before the second dielectric film is formed. Needed for oxygen adsorption or diffusion is only to permit the substrate with the recording film formed thereon to stand in a vacuum chamber or, in the alternative, to expose the surface of the recording film to rare gas such as Ar or $N_2$ gas admitted in a vacuum chamber. In either case, no oxygen is admitted in the vacuum chamber. Nor is discharge needed. While the reason the above-mentioned oxygen content has a peak even in the absence of oxygen or discharge remains unclarified, it is believed that the presence of a very trace amount of oxygen and moisture in the vacuum chamber has some relation thereto. Thus, $(O_E-Fe_S)/(Fe_E-Fe_S)$ can be allowed to come within the range mentioned above by suitable selection or control of various conditions such as the time for allowing the substrate to stand in a vacuum chamber, the time for exposing the surface of the recording film to rare gas or $N_2$ gas, the amount of impurities in the rare gas or $N_2$ gas, and the temperature at which the substrate is heated, etc.

No particular limitation is again imposed on how to control $(N_E-Fe_S)/(Fe_E-Fe_S)$, but the following method is preferred as an example. That is, a target for forming the recording film or the second dielectric film is used for sputtering at low deposit rate (film-deposition rate) in a nitrogen-containing atmosphere. Specifically, when the target for forming the recording film is used, sputtering occurs at a deposit rate lower than that for the recording film. When the target for forming the second dielectric film is used, on the other hand, sputtering takes place at a deposit rate lower than that for the second dielectric film. The application of a reduced deposit rate is to avoid any possible damage to the recording film due to nitrogen. The sputtering atmosphere may be the same as used for ordinary reactive sputtering wherein nitrogen is used as a reactive gas. This sputtering is carried out to control the nitrogen diffusion index in the vicinity of the surface of the recording film, but for this sputtering it is unnecessary to provide a continuous form of film on the surface of the recording film. In this regard, it is noted that the preferable deposit rate range, because of varying depending on various conditions including discharging atmosphere, may be experimentally determined such that the $(N_E-Fe_S)/(Fe_E-Fe_S)$ mentioned above is achievable.

The second dielectric film is preferably formed by reactive sputtering. In this case, the target used is made up of the metal element M and the reactive gas used is $N_2$ gas. Here, if the oxygen and nitrogen diffusion indices are controlled as mentioned above, it is then possible to allow $(M_E-Fe_S)/(Fe_E-Fe_S)$ to come within the preferable range mentioned above. Alternatively, $(M_E-Fe_S)/(Fe_E-Fe_S)$ may be regulated by suitable control of sputtering gas pressure or power, or by use of a bias sputtering technique.

It is noted that the sputtering conditions for forming the recording film are not critical, and may be the same as conventional conditions known so far in the art.

The reflective film 7 is provided to improve C/N. The material of which the reflective film 7 is formed is preferably metals such as Au, Ag, Pt, Al, Ti, Cr, Ni and Co, or alloys or compounds containing these metals. The reflective film 7 is preferably formed by sputtering. The reflective film 7 has preferably a thickness of about 30 to about 200 nm.

The protective coat 8 is a resin film which is provided for the purpose of protecting the sputtered films laminated or otherwise stacked up to the reflective film 7. The resin of which the protective coat 8, albeit not particularly limited, is preferably a cured product of a radiation curable compound. A preferable radiation curable compound is one having an acrylic group. Preferably, a coating containing such a radiation curable compound and a photo-polymerization sensitizer or initiator is cured with UV radiation or electron radiation to form a protective coat. The protective coat 8 is generally 1 to 30 μm thick, preferably 2 to 20 μm thick. If the film is too thin, it is then difficult to obtain a uniform film, offering a problem of less durability. Too thick a film is likely to crack due to shrinkage upon curing or cause the disc to deflect.

It is understood that a transparent hard coat 3 may be formed on the rear surface of the transparent substrate 2 as illustrated. The hard coat may be the same as the protective coat 8 in terms of material and thickness. The hard coat is preferably made anti-static by the addition thereto of a surfactant, for instance. The hard coat need not be limited to the major surface of the disc, but may be provided on the outer and inner peripheral edges thereof.

Figure 6:
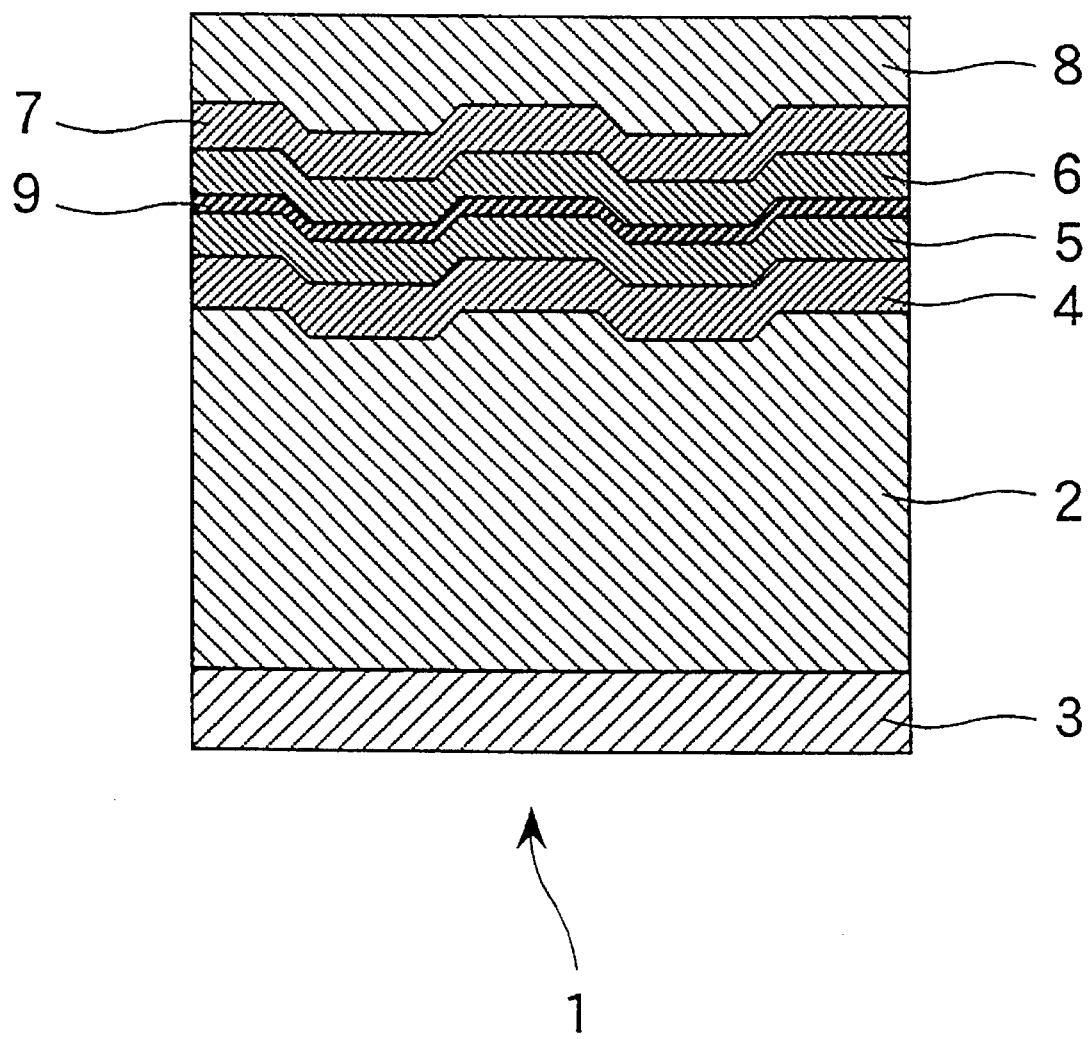
FIG. 6 is a partial sectional view of one exemplary arrangement of another magneto-optical disc according to this invention.

FIG. 6 illustrates another exemplary arrangement of the magneto-optical recording medium of this invention, which is similar to the arrangement of FIG. 1 with the exception that an intermediate film 9 is interposed between the recording film 5 and the second dielectric film 6.

The intermediate film 9 is a film that is formed of a metal comprising at least one metal element. The metal element contained in the intermediate film is different from the metal element contained in the second dielectric film. When the intermediate film and/or the second dielectric film contain two or more metal elements, the metal elements contained in the intermediate film may be either entirely or partly different from those contained in the second dielectric film. In the former case, it is preferable that at least one of the intermediate and second dielectric films contains metal elements that are not contained in the other at a ratio of at least 10 at %. That "ratio" is here understood to refer to a ratio with respect to the total metal elements in the films. In this regard, trace elements such as impurities may not be taken into account. In other words, only metal elements contained in amounts of at least 5 at % in the starting metals of the films may be taken into consideration.

The metal element contained in the intermediate film is also different from the metal element contained in the recording film. The metal elements contained in the intermediate film are to those contained in the recording film what the metal elements contained in the intermediate film are to those contained in the second dielectric film; that is, the metal elements in the former film may be entirely or partly different from those in the latter. In this case, the same as mentioned in connection with the intermediate and second dielectric films can hold for the ratio of different metal elements.

No particular limitation is placed on the composition of the metal(s) (or its alloy) forming the intermediate film. However, this composition preferably contains at least one element selected from the groups 4, 5, 6, 8, 9, 10, 11, 13 and 14 elements of the periodic table described in "IUPAC Nomenclature for Inorganic Compounds, Revised Edition (1989)". More illustratively, the composition preferably contains at least one element selected from Ti, Zr, V, Nb, Ta, Cr, Mo, W, Fe, Co, Ni, Pd, Pt, Cu, Ag, Au, Al, and Si.

The lower limit of the thickness of the intermediate film is 1Å, preferably 2Å, while the upper limit of the thickness is 28Å, preferably 18Å. By imparting a suitable thickness to the intermediate film, it is possible to obtain much higher C/N in a low magnetic field. It is noted that when the intermediate film is formed of a ferromagnetic metal, it is required to make the intermediate film thinner so as to obtain properties equivalent to those obtained when a non-ferromagnetic metal is formed into film. The intermediate film, when formed of a ferromagnetic metal, has a thickness of preferably up to 18Å, more preferably up to 10Å.

It is understood that the thickness of the intermediate film is calculated from sputtering rate and sputtering time. For the determination of the sputtering rate used for film thickness calculation, sputtering is carried out under the same conditions as actual film deposition for a long time to form a thick film, and the thickness of the film is then actually measured. The sputtering rate is calculated from the thus found thickness and the sputtering time.

The intermediate film is prepared by a metal film deposition technique, for instance, by sputtering a metal target, as will be described later. For instance, when elementary analysis of the vicinity of the intermediate film is made by Auger electron spectroscopy, elements contained in the dielectric films, elements contained in the recording film, or impurities such as argon, oxygen and nitrogen contained in the atmospheres used for the formation of the respective films are usually detected. Since the intermediate film is extremely thin, the proportion in the intermediate film of those elements which have penetrated the intermediate film through the dielectric film due to diffusion is relatively high as compared with other contaminant elements. Since the thickness of the intermediate film is calculated from sputtering rate and time, it is presumed that as thin a thickness as about 1 to 2Å can include a case where no substantial film form is available. By use of a certain film deposition technique that enables film to be formed at a thickness of 1 to 2Å on calculation, however, the benefit of improving C/N is well accomplished even when any film form is actually unavailable.

The intermediate film is formed in a rare gas atmosphere, while no oxygen is introduced in a vacuum chamber.

EXAMPLE

This invention will now be explained at greater length with reference to some illustrative examples.

Example 1

Each of the magneto-optical disc samples shown in Table 1 was prepared by successively forming on a transparent substrate a first dielectric film, a recording film, a second dielectric film, a reflective film and a protective coat under the conditions mentioned below.

Transparent Substrate

The transparent substrate used was a disc form of polycarbonate resin sheet of 64 mm in outer diameter, 11 mm in inner diameter and 1.2 mm in thickness.

First Dielectric Film

A vacuum chamber was evacuated to $5.0 \times 10^{-5}$ Pa or less. While Ar and $N_2$ gases were passed through the vacuum chamber, reactive magnetron sputtering was carried out using Si as the target, thereby forming a first dielectric film composed predominantly of Si—N.

The sputtering conditions applied were:
Input power: 1 kW (RF)
Sputtering gas pressure: 0.1 Pa
Ar gas flow rate: 31 SCCM
$N_2$ gas flow rate: 19 SCCM The first dielectric film had a thickness of 60 nm. In this example, the thickness of each film was calculated from the sputtering rate and time. For determining the sputtering rate, sputtering was carried out under the same conditions as actual film deposition for a long time to form a thick film. The sputtering rate was then calculated from the thus found film thickness and the sputtering time.

Recording Film

After the formation of the first dielectric film, the vacuum chamber was again evacuated to $5.0 \times 10^{-5}$ Pa or lower. While Ar gas was passed through the vacuum chamber, reactive magnetron sputtering was carried out using a Tb—Fe—Co system alloy as the target, thereby forming a recording film composed predominantly of Tb—Fe—Co. The sputtering conditions applied were:
Input power: 1 kW (DC)
Sputtering gas pressure: 0.2 Pa
Ar gas flow rate: 98 SCCM The thickness of each recording film is shown in Table 1.

Control of the Oxygen Diffusion Index

After the formation of the recording film, the substrate was allowed to stand for 10 minutes while Ar gas was passed through the vacuum chamber. By varying the Ar flow rate the oxygen diffusion index was controlled.

Control of the Nitrogen Diffusion Index

Then, the vacuum chamber was again evacuated to $5.0 \times 10^{-5}$ Pa or lower for low power sputtering using Si as the target. The sputtering conditions applied were:
Input power: 0.2 to 0.5 kW (RF)
Sputtering gas pressure: 0.08 to 0.1 Pa
Ar gas flow rate: 31 SCCM
$N_2$ gas flow rate: 19 SCCM By varying the discharging time during sputtering the nitrogen diffusion index was controlled, and by controlling the combination of the input power and sputtering gas pressure the diffusion index of the metal element (Si) was controlled.

Second Dielectric Film

Then, the vacuum chamber was again evacuated to $5.0 \times 10^{-5}$ Pa or lower. While Ar and $N_2$ gases were passed through the vacuum chamber, reactive magnetron sputtering was carried out using Si as the target, thereby forming a second dielectric film composed predominantly of Si—N. The sputtering conditions applied were:
Input power: 1 kW (RF)
Sputtering gas pressure: 0.08 to 0.1 Pa
Ar gas flow rate: 31 SCCM
$N_2$ gas flow rate: 19 SCCM The second dielectric film had a thickness of 30 nm.

Reflective Film

After the formation of the second dielectric film, the vacuum chamber was again evacuated to $5.0 \times 10^{-5}$ Pa or lower. While Ar gas was passed through the vacuum chamber, reactive magnetron sputtering was carried out using Al as the target, thereby forming a reflective film composed predominantly of Al. The sputtering conditions applied were:
Input power: 750 W (DC)
Sputtering gas pressure: 0.15 Pa
Ar gas flow rate: 50 SCCM The reflective film had a thickness of 60 nm.

Protective Film

A coating of the following polymerizable composition was formed by spin coating and exposed to UV radiation for curing. After curing, the coat was found to have an average thickness of about 5 µm.

| Polymerizable Composition | Parts by Weight |
| --- | --- |
| Oligoester acrylate (molecular weight 5,000) | 50 |
| Trimethylolpropane triacrylate | 50 |
| Acetophenone photo-polymerization initiator | 3 |

On the magneto-optical disc samples thus obtained, 3T signals of EFM were recorded at a linear velocity of 1.28 m/s and an external magnetic field strength (Hex) shown in Table 1. Optimal recording power was used depending on the thickness of the recording film of each sample. For instance, a recording power of 4.5 mW was used for the sample having a recording film of 20 nm in thickness and 6.5 mW for the sample having a recording film of 80 nm in thickness. Then, C/N was measured using a MD rating system MJ-6100 manufactured by Sony Techtronics Co., Ltd. The results or the initial C/N values are reported in Table 1.

Next, the protective film was removed from each sample Then, the sample was placed in a vacuum chamber of an apparatus for Auger electron spectroscopy. The vacuum chamber was evacuated for 24 hours until a pressure of $7.0 \times 10^{-10}$ Torr was reached. With evacuation further continued, the element distribution was measured by Auger electron spectroscopy from the second dielectric film side in the thickness direction. The conditions for Auger electron spectroscopy applied were:
Electron gun accelerating voltage: 5 kV
Electron gun irradiating current: 500 nA
Ion gun accelerating voltage: 2 kV
Argon ion incidence angle: 58.9°

The amount of the elements was measured in an intermittent etching manner (the span of time of one etching cycle: 45 seconds) while etching was carried out with argon ions in the thickness direction. The etching rate was 13.2 Å/min for the second dielectric film and 12.2 Å/min for the recording film. Quantitative determination was carried out for 15 to 45 seconds for each sample.

From the above-mentioned charts prepared on the basis of the measurement results of Auger electron spectroscopy, $(O_E-Fe_S)/(Fe_E-Fe_S)$, $(N_E-Fe_S)/(Fe_E-Fe_S)$ and $(M_E-Fe_S)/(Fe_E-Fe_S)$ were calculated. Also, the ratio of the diffusion indices was found. The results are shown in Table 1 together $O_{M2}$, $O_B$ and $N_M$.

Figure 4:
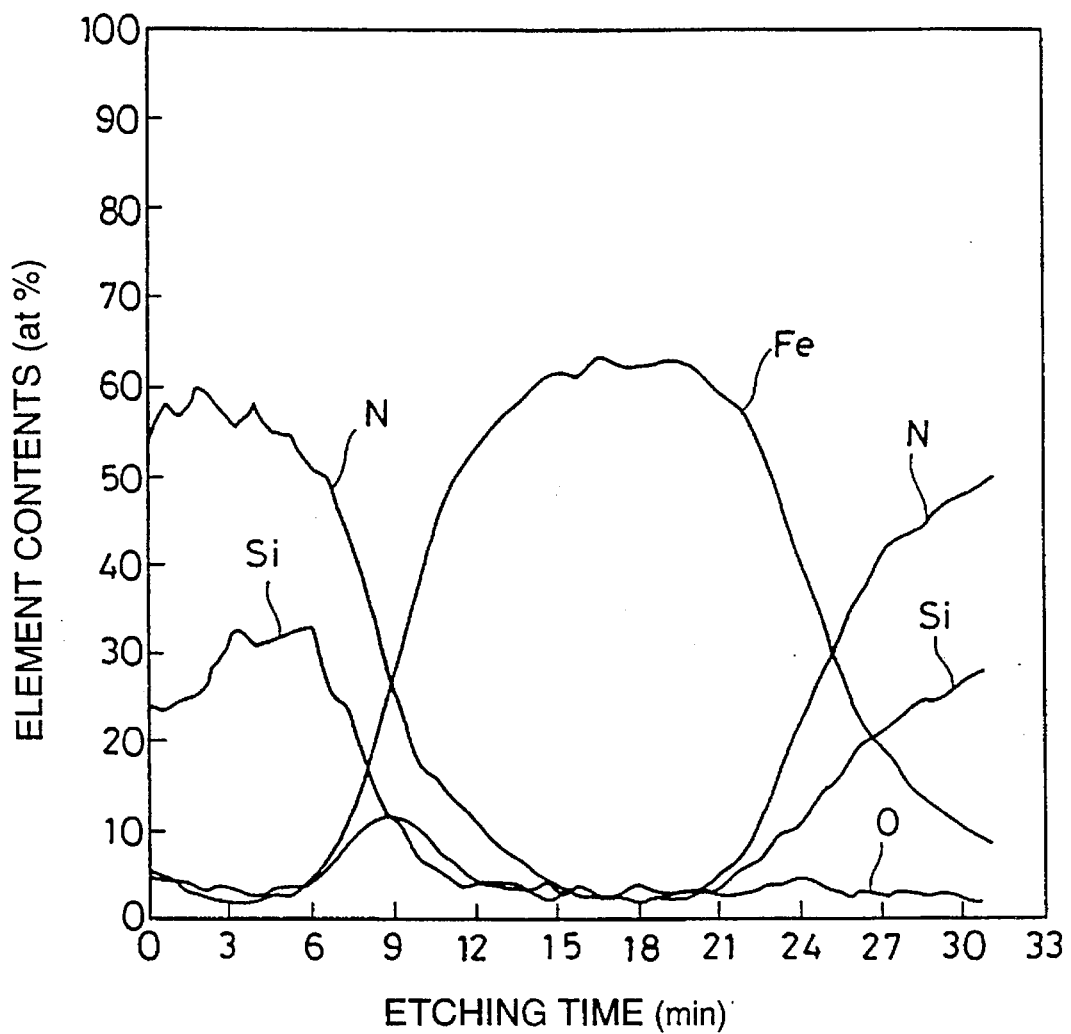
FIG. 4 is a chart for illustrating the results obtained by subjecting one inventive sample (No. 4-1 in Table 1) to Auger electron spectroscopy.
Figure 5:
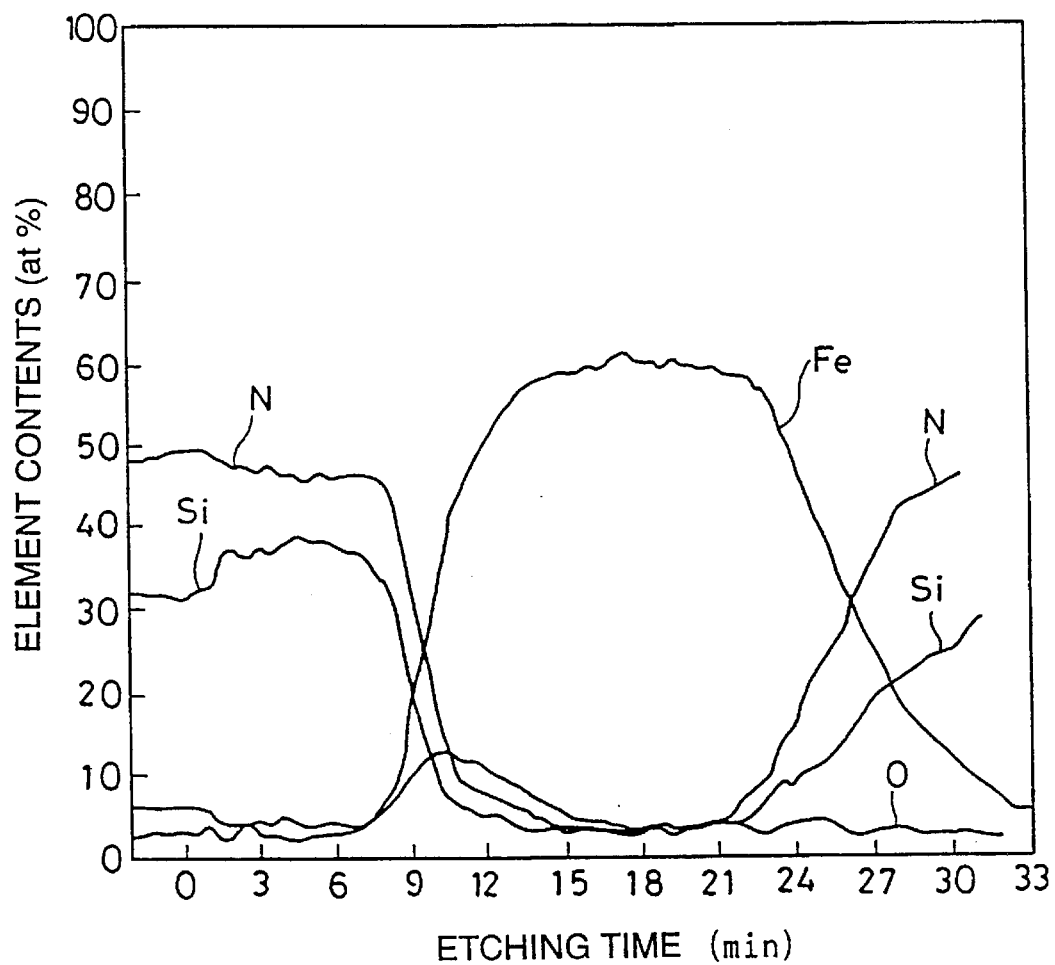
FIG. 5 is a chart for illustrating the results obtained by subjecting one comparative sample (No. 8 in Table 1) to Auger electron spectroscopy.

For further reference, the charts of the inventive sample (No. 4-1 in Table 1) and the comparative sample (No. 8 in Table 1) are presented in the form of FIGS. 4 and 5, respectively.

oxygen and nitrogen diffusion indices coming within the preferable ranges, no C/N deterioration was observed. In the comparative samples with at least one of the oxygen and nitrogen diffusion indices departing from the inventive

TABLE 1

| Sample No. | Diffusion Indices | | | | |
|---|---|---|---|---|---|
| | Oxygen $(O_E-Fe_S)/(Fe_E-Fe_S)$ | Nitrogen $(N_E-Fe_S)/(Fe_E-Fe_S)$ | Metal $(M_E-Fe_S)/(Fe_E-Fe_S)$ | Oxygen/Nitrogen $(O_E-Fe_S)/(N_E-Fe_S)$ | Metal/Nitrogen $(M_E-Fe_S)/(N_E-Fe_S)$ |
| 1 (Comparison) | 0.15 | 0.33* | 0.08 | 0.455* | 0.242 |
| 2 (Comparison) | 0.09** | 0.37** | 0.17* | 0.243* | 0.459 |
| 3 | 0.12 | 0.29* | 0.11 | 0.414* | 0.379 |
| 4-1 | 0.18 | 0.17 | 0.04 | 1.059 | 0.235 |
| 4-2 (Comparison) | 0.15 | 0.16 | 0.21** | 0.938 | 1.235* |
| 5 | 0.20 | 0.20 | 0.13 | 1.000 | 0.650 |
| 6 | 0.38* | 0.22 | 0.19* | 1.727 | 0.864 |
| 7 (Comparison) | 0.42** | 0.26* | 0.35** | 1.615 | 1.346* |
| 8 (Comparison) | 0.27 | 0.08** | 0.08 | 3.375* | 1.000 |
| 9 | 0.18 | 0.16 | 0.11 | 1.125 | 0.688 |
| 10 | 0.19 | 0.12 | 0.07 | 1.583 | 0.583 |
| 11 (Comparison) | 0.18 | 0.13 | 0.05 | 1.385 | 0.385 |

| Sample No. | $O_{M2}$ (at. %) | $O_B$ (at. %) | $N_M$ (at. %) | M | Recording film thickness (nm) | Initial C/N (dB) | |
|---|---|---|---|---|---|---|---|
| | | | | | | Hex = 60 (Oe) | Hex = 80 (Oe) |
| 1 (Comparison) | 4.0** | 2.0 | 54.0 | Si | 20 | 43.5 | 45.5 |
| 2 (Comparison) | 5.0 | 2.0 | 49.5 | Si | 20 | 41.5 | 44.0 |
| 3 | 8.0 | 3.0 | 50.0 | Si | 20 | 43.5 | 46.5 |
| 4-1 | 12.0 | 2.0 | 60.0 | Si | 20 | 47.0 | 47.5 |
| 4-2 (Comparison) | 10.0 | 2.0 | 57.0 | Si | 20 | 47.0 | 47.5 |
| 5 | 13.5 | 4.0 | 49.5 | Si | 20 | 46.5 | 47.0 |
| 6 | 21.0* | 5.0 | 49.0 | Si | 20 | 44.5 | 46.5 |
| 7 (Comparison) | 26.0** | 4.0 | 50.0 | Si | 20 | 41.5 | 44.0 |
| 8 (Comparison) | 13.0 | 3.0 | 49.0 | Si | 20 | 46.5 | 47.0 |
| 9 | 11.0 | 2.0 | 51.0 | Si | 40 | 46.0 | 46.5 |
| 10 | 18.0 | 2.0 | 48.5 | Si | 60* | 43.0 | 46.0 |
| 11 (Comparison) | 20.0 | 3.0 | 49.0 | Si | 80** | 39.0 | 42.0 |

**Departures from the inventive range
*Departures from the preferable range

The effectiveness of this invention is evident from the results reported in Table 1. As previously mentioned, mini-discs are desired to have at least 46 dB C/N upon recording in a low magnetic field of up to 100 Oe, preferably up 80 Oe. All the inventive samples with the oxygen and nitrogen diffusion indices coming within the predetermined ranges give sufficient C/N.

In Sample No. 2 with the oxygen and nitrogen diffusion indices departing from the inventive ranges and Sample No. 7 with the oxygen diffusion index departing from the inventive range, however, the initial C/N is as low as 44 dB at an external magnetic field strength of 80 Oe. In Sample No. 11 wherein the recording film has a thickness of 80 nm as in the case of each sample shown in FIG. 4 of the previously mentioned JP-A 32750/1988, C/N is very low or 42 dB at an external magnetic field strength of 80 Oe.

C/N after Accelerated Testing at High Temperature and High Humidity

Magneto-optical discs prepared under the same conditions as in the samples shown in Table 1 were similarly measured in terms of C/N after 1,000-hour storage at 80° C. and 80% RH. As a result, it has been found that the inventive samples give at least 46.0 dB C/N even after the accelerated testing. Especially in Sample Nos. 4-1, 5, 9 and 10 with the ranges, on the other hand, deterioration was observed. Especially in Sample No. 8 wherein the nitrogen diffusion index is below the lower limit of the inventive range although the oxygen diffusion index is within the inventive range, C/N was initially sufficient or 47 dB at an external magnetic field strength of 80 Oe, but decreased to 45.5 dB after the accelerated testing at high temperature and high humidity.

It is additionally noted that $(O_{M1}-O_B)$ between the first dielectric and recording films was 4 at % or lower for each sample shown in Table 1.

Example 2

Sample Nos. 4-1 and 4-2 shown in Table 1 were measured for C/N at varying recording magnetic fields and linear velocities, as shown in Tables 2 and 3. The results are shown in Tables 2 and 3.

TABLE 2

Sample No. 4-1
$\{(M_E-Fe_S)/(Fe_E-Fe_S) = 0.04\}$

| Magnetic Field Strength (Oe) | C/N (dB) | |
|---|---|---|
| | Linear Velocity 1.28 m/s | Linear Velocity 2.56 m/s |
| 80 | 47.5 | 46.0 |
| 100 | 49.0 | 47.5 |
| 200 | 50.0 | 48.5 |
| 300 | 50.0 | 48.5 |

TABLE 3

Sample No. 4-2 (for comparison)
$\{(M_E-Fe_S)/(Fe_E-Fe_S) = 0.21\}$

| Magnetic Field Strength (Oe) | C/N (dB) | |
|---|---|---|
| | Linear Velocity 1.28 m/s | Linear Velocity 2.56 m/s |
| 80 | 47.5 | 46.0 |
| 100 | 48.0 | 46.5 |
| 200 | 48.0 | 46.5 |
| 300 | 48.0 | 46.5 |

As can be seen from Tables 2 and 3, by controlling the diffusion index of the metal element of the second dielectric film it is possible to obtain high C/N even upon recording at a high magnetic field strength and improve C/N at high recording linear velocity.

Example 3

A magneto-optical disc sample having an intermediate film such as one shown in FIG. 6 was prepared. The intermediate film was formed after the formation of the recording film. The intermediate film was formed by reactive magnetron sputtering using Al as the target, while Ar gas was passed through a vacuum chamber. The sputtering conditions applied were:

Input power: 400 W

Sputtering gas pressure: 0.1 Pa

Ar gas flow rate: 40 SCCM

The intermediate film had a thickness of 28Å. The rest of each sample was formed as in Sample Nos. 4-1 prepared in Example 1. This sample was improved in terms of magnetic field sensitivity and reproduction stability.

We claim:

1. A magneto-optical recording medium for recording light comprising a first dielectric film, a recording film of a rare earth element-transition metal alloy, a second dielectric film, and a film reflective to at least a portion of said light on a substrate transparent to said light the elements being in the described order, comprising:

a metal element M and nitrogen N are contained in the second dielectric film, Fe is contained in the recording film, and oxygen O is contained adjacent the boundary between the second dielectric and recording films, said magneto-optical recording medium conforming to the following condition:

$$0.10 \leq (O_E-Fe_S) \leq 0.40$$

where $O_E$ is the etching time at which the O content in the vicinity of the boundary between the second dielectric and recording films becomes $\{(O_{M2}-O_B)/5\}+O_B$ where $O_{M2}$ is the maximum value of the oxygen O content in the vicinity of the boundary between the second dielectric and recording time films, and $O_B$ is the minimum value of the oxygen O content in the recording film, wherein $O_E>O_P$ where $O_P$ is the etching time at which the oxygen O content becomes $O_{M2}$, $Fe_S$ is the etching time at which the Fe content adjacent the boundary between the second dielectric and recording films decreases to ⅕ of $Fe_M$ where $Fe_M$ is the maximum value of the Fe content in the recording film, $Fe_E$ is the etching time at which the Fe content adjacent the boundary between the first dielectric and recording films decreases to ⅕ of $Fe_M$, said magneto-optical recording medium conforming to the following condition:

$$0.10 \leq (N_E-Fe_S)/(Fe_E-Fe_S) \leq 0.35$$

where $N_E$ is the etching time at which the N content in the vicinity of the boundary between the second dielectric and recording films decreases to ⅕ of $N_M$ where $N_M$ is the maximum value of the N content in the second dielectric film, said magneto-optical recording medium conforming to the following condition:

$$0 \leq (M_E-Fe_S)/(Fe_E-Fe_S) \leq 0.20$$

where $M_E$ is the etching time at which the content of the metal element M in the vicinity of the boundary between the second dielectric and recording films decreases to ⅕ of $M_M$ where $M_M$ is the maximum value of the content of the metal element M in the second dielectric film, $O_{M2}$ being 5 to 25 at %, and the thickness of the recording film being up to 65 nm.

2. The magneto-optical recording medium of claim 1 which further conforms to $$0.10 \leq (O_E-Fe_S)/(Fe_E-Fe_S) \leq 0.35.$$

3. The magneto-optical recording medium of claim 1 which further conforms to $$0.10 \leq (N_E-Fe_S)/(Fe_E-Fe_S) \leq 0.25.$$

4. The magneto-optical recording medium of claim 1 which further conforms to $$0 \leq (M_E-Fe_S))/(Fe_E-Fe_S) \leq 0.15.$$

5. The magneto-optical recording medium of claim 1 wherein $O_{M2}$ is 5 to 20 at %.

6. The magneto-optical recording medium of claim 1 wherein the thickness of the recording film is 10 to 45 nm.

7. The magneto-optical recording medium of claim 1 which further includes an intermediate film between the recording and second dielectric films, said intermediate film being formed of a metal containing at least one metal element, the metal element contained in the intermediate film being different from the metal element contained in the second dielectric film, and the thickness of the intermediate layer being 1 to 28Å.

8. The magneto-optical recording medium of claim 1 which further conforms to the following condition:

$$O_{M1} < O_{M2}$$

where $O_{M1}$ is the maximum value of the oxygen content in the vicinity of the boundary between the first dielectric and recording films.

9. The magneto-optical recording medium of claim 8 which further conforms to $$0 \leq (O_{M1} - O_B) \leq 10 \text{ at \%}.$$

10. The magneto-optical recording medium of claim 1 wherein the minimum value $O_B$ of the oxygen content in the recording film is up to 7 at %.

11. The magneto-optical recording medium of claim 1 wherein the metal element M contained in the second dielectric film is selected from the group consisting of Si and Al.

12. The magneto-optical recording medium of claim 1 wherein the maximum value $N_M$ of the N content in the second dielectric film is at least 30 at %.

13. The magneto-optical recording medium of claim 1 operative at a linear velocity of 2.4 to 5.6 m/s relative to a recording head.

* * * * *